United States Patent
Omachi et al.

(10) Patent No.: US 12,521,747 B2
(45) Date of Patent: Jan. 13, 2026

(54) METHOD FOR ADJUSTING PRESSURE OF MIXTURE OF GAS AND PASTE MATERIAL DISCHARGED FROM DISPENSER

(71) Applicant: SUNSTAR ENGINEERING INC., Osaka (JP)

(72) Inventors: Takuro Omachi, Osaka (JP); Masaharu Takada, Osaka (JP); Kiichi Yamashita, Osaka (JP)

(73) Assignee: SUNSTAR ENGINEERING INC., Osaka (JP)

( * ) Notice: Subject to any disclaimer, the term of this patent is extended or adjusted under 35 U.S.C. 154(b) by 604 days.

(21) Appl. No.: 17/847,609

(22) Filed: Jun. 23, 2022

(65) Prior Publication Data
US 2022/0410198 A1 Dec. 29, 2022

(30) Foreign Application Priority Data

Jun. 25, 2021 (EP) .................................... 21181719

(51) Int. Cl.
*B05B 12/08* (2006.01)
*B05B 7/00* (2006.01)
(Continued)

(52) U.S. Cl.
CPC .......... *B05B 12/087* (2013.01); *B05B 7/0031* (2013.01); *B05B 7/025* (2013.01); *B29C 44/022* (2013.01)

(58) Field of Classification Search
CPC ... B05B 7/0031; B05B 7/1481; B05B 12/008; B05C 11/1036; B05C 5/0237;
(Continued)

(56) References Cited

U.S. PATENT DOCUMENTS 3,773,298 A * 11/1973 Gebert .................. B29C 45/231
261/DIG. 26
4,440,500 A * 4/1984 Schneider ............. B29B 7/7668
366/159.1

(Continued)

FOREIGN PATENT DOCUMENTS

DE 3542767 6/1987
DE 4217835 12/1993
(Continued)

OTHER PUBLICATIONS

Office Action issued Feb. 24, 2022 in corresponding EP Patent Application No. 21181719.2.
(Continued)

*Primary Examiner* — Paul R Durand
*Assistant Examiner* — Randall A Gruby
(74) *Attorney, Agent, or Firm* — Wenderoth, Lind & Ponack, L.L.P.

(57) ABSTRACT

A dispenser for discharging a mixture of gas and a paste material includes: a nozzle part (2) provided in a tip end part of a body (11) and having a tip end opening; a flow path (4) for the mixture extending from an introduction part (5) for the mixture to the tip end opening through a hollow space of the nozzle part; a needle part (3) movable in the flow path of the nozzle part to open and close the flow path 4; a driving part (7, 8, and 9) that drives the needle part; and a stopper part (10, 14, and 16) that limits an operation range of the needle part. The nozzle part as a tapered section in which an inside diameter of the flow path of the nozzle part relative to an operation range of a tip end of the needle part decreases toward the tip end opening.

10 Claims, 12 Drawing Sheets

(51) Int. Cl.
*B05B 7/02* (2006.01)
*B29C 44/02* (2006.01)

(58) Field of Classification Search
CPC ... B05C 5/0216; B29B 7/7419; B29B 7/7409; B29B 7/7414; B29B 7/726; B29B 7/728; B29B 7/746; B29C 44/022; B29C 44/3442; B29C 44/461; B29C 44/50
See application file for complete search history.

(56) References Cited

U.S. PATENT DOCUMENTS

| | | | |
|---|---|---|---|
| 4,465,212 A | | 8/1984 | Boone |
| 4,535,919 A | * | 8/1985 | Jameson ............... B05B 7/262 137/538 |
| 5,089,190 A | | 2/1992 | Trevathan et al. |
| 5,207,352 A | * | 5/1993 | Porter .................. B29B 7/7409 222/1 |
| 5,462,199 A | | 10/1995 | Lenhardt |
| 7,422,164 B2 | | 9/2008 | Matsumoto |
| 8,857,732 B2 | | 10/2014 | Brose et al. |
| 2004/0188001 A1 | | 9/2004 | Okuda et al. |
| 2008/0197209 A1 | * | 8/2008 | Ganzer ................ B05B 7/0483 239/137 |
| 2009/0101669 A1 | | 4/2009 | Hassler, Jr. et al. |
| 2010/0209592 A1 | | 8/2010 | Wanthal et al. |
| 2010/0258592 A1 | * | 10/2010 | Tracy .................... F04B 17/03 222/333 |
| 2011/0079618 A1 | | 4/2011 | Chastine et al. |
| 2018/0264421 A1 | | 9/2018 | Nakanishi et al. |

FOREIGN PATENT DOCUMENTS

| | | |
|---|---|---|
| EP | 0040068 | 11/1981 |
| EP | 0 427 985 | 5/1991 |
| EP | 0 509 323 | 10/1992 |
| GB | 911566 | 11/1962 |
| JP | 3-178362 | 8/1991 |
| JP | 5-115816 | 5/1993 |
| JP | 2004-330600 | 11/2004 |
| JP | 2005-81647 | 3/2005 |
| JP | 2006-289276 | 10/2006 |
| JP | 2008-207176 | 9/2008 |
| JP | 2009-84480 | 4/2009 |
| JP | 2016-109776 | 6/2016 |
| JP | 2017-29904 | 2/2017 |
| JP | 2017-109192 | 6/2017 |
| WO | 00/029194 | 5/2000 |
| WO | 2016/125900 | 8/2016 |

OTHER PUBLICATIONS

Extended European Search Report issued Nov. 18, 2021 in corresponding European Patent Application No. 21181719.2.
Office Action issued Jun. 5, 2025 in U.S. Appl. No. 17/789,366.
International Search Report issued Mar. 17, 2020 in International Application No. PCT/JP2019/051559.
Office Action issued Aug. 6, 2021 in European Patent Application No. 19861262.4.
Office Action issued Apr. 28, 2022 in European Patent Application No. 19861262.4.
Counterclaim for Revocation issued Mar. 6, 2025 in European Patent No. 4108413.
Office Action issued Feb. 14, 2025 in U.S. Appl. No. 17/789,366.

* cited by examiner

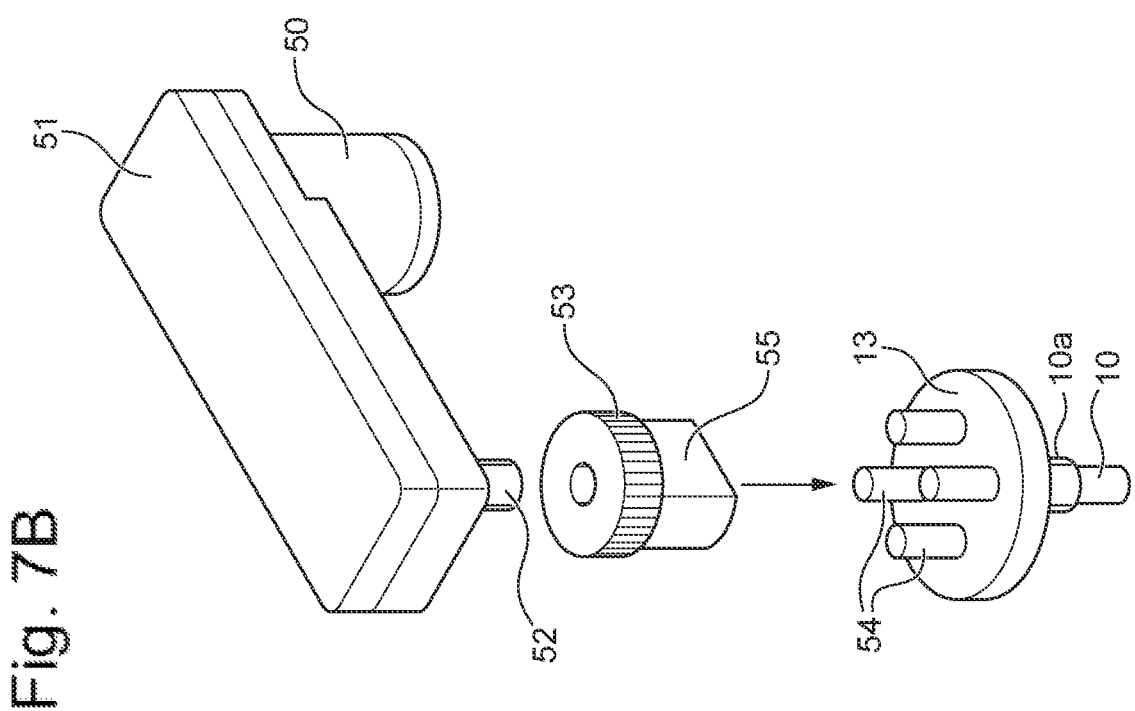
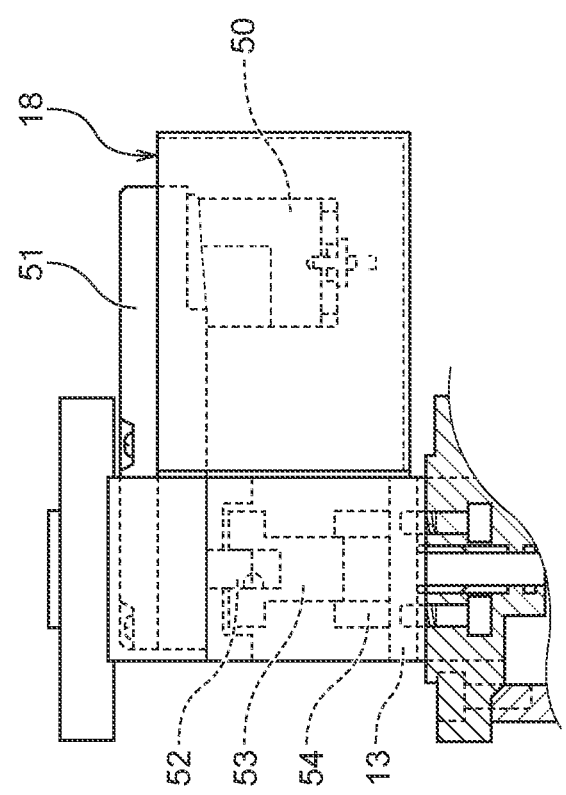
Fig. 7A
Fig. 7B

METHOD FOR ADJUSTING PRESSURE OF MIXTURE OF GAS AND PASTE MATERIAL DISCHARGED FROM DISPENSER

TECHNICAL FIELD

The present invention is related to a method for adjusting pressure of a mixture of a paste material and gas discharged from a dispenser in a mechanical foaming device that generates and discharges the mixture.

BACKGROUND ART

A technique is known by which a mixture obtained by mixing and micro-dispersing gas in a paste material is discharged from a nozzle and applied to an object (see PTL 1 listed below).

The nozzle described above is provided in a tip end part of a dispenser. To an introduction port of the dispenser, the mixture of the gas and the paste material is forwarded through a pipe at relatively high pressure (4 MPa or higher), so that the mixture travels from a flow path inside the body of the dispenser through the nozzle, so as to be discharged from a tip end opening of the nozzle. An upper limit of the pressure of the paste material is typically set to be 30 MPa or lower or 20 MPa or lower, in consideration of pressure tolerance of pipes, hoses, and the like. When the pressure is too high, it means that the flow path has become narrow, which may be a cause of clogging. Possible causes of the narrowing of the flow path include, for example: the situation where a hardening agent in a powder form contained in the material is crushed by high pressure, shear force, or the like, so as to start a reaction and get hardened in the pipe; and the situation where temperature is increased by friction between the material and the pipe or the nozzle, so that the material starts reacting and gets hardened in the pipe.

In contrast, when the material is transported in the pipe while the pressure of the material is too low, the bubbles of the gas in the material become relatively large and may break when being rubbed against the lateral wall of the pipe during the transport. There is a possibility that the gas from the broken bubbles may aggregate, so that the clump of gas may become large at the time of the discharge, and the gas may escape at the time of the discharge from the nozzle. As a result, not only it will be impossible to realize a foamed body in which bubbles are evenly dispersed, but also it will be impossible to achieve a targeted foam expansion ratio.

CITATION LIST

Patent Literature

PTL 1:
Japanese Patent Laid-Open No. 2006-289276

SUMMARY OF INVENTION

Technical Problem

In view of the circumstances described above, it is an object of the present invention to provide a method for adjusting the pressure of the mixture of a paste material and gas discharged from the dispenser, the method making it possible to form a foamed body in which bubbles are appropriately dispersed in the paste material without clogging the nozzle.

Solution to Problem

To solve the problems described above, the present invention provides a method for adjusting pressure of a mixture of a paste material and gas discharged from a dispenser in a mechanical foaming device that generates and discharges the mixture, wherein the dispenser includes: a nozzle part provided in a tip end part of the dispenser and having a tip end opening through which the mixture is discharged; a flow path for the mixture extending from an introduction part for the mixture to the tip end opening through an inside of the nozzle part; a needle part movable in the flow path of the nozzle part to open and close the flow path; and a driving part that drives the needle part, the nozzle part has a tapered section in which an inside diameter of the flow path of the nozzle part relative to an operation range of a tip end of the needle part decreases toward the tip end opening, as a result of the tip end of the needle part abutting against a closed position of the tapered section, the flow path for the mixture is closed, whereas as a result of the tip end of the needle part moving away from the closed position, the flow path is opened, further provided are: a stopper part that limits a moving range of the tip end of the needle part to a range from the closed position to a stop position located rearward relative to the closed position; and a stopper position adjusting part that adjusts a position of the stopper part to change the stop position, and the method comprises a pressure adjusting step of adjusting discharge pressure of the mixture discharged from the tip end opening of the nozzle part to be pressure within a pressure range of 4 MPa to 15 MPa, by adjusting the position of the stopper part with the stopper position adjusting part. Preferably, the pressure range of the mixture is either from 5 MPa to 12 MPa or from 6 MPa to 10 MPa.

According to a preferable mode of the present invention, the mechanical foaming device further includes a pressure sensor to measure the discharge pressure, and the pressure adjusting step comprises adjusting the discharge pressure on a basis of the pressure of the mixture detected by the pressure sensor at a time of the mixture being supplied to the dispenser.

According to another preferable mode of the present invention, the pressure adjusting step comprises estimating the discharge pressure by using a relationship among the discharge pressure, a needle gap amount being a distance between the closed position of the tip end of the needle part and the stop position, viscosity of the paste material, and a discharge flow amount of the mixture and adjusting the needle gap amount so that the estimated discharge pressure is pressure within the pressure range.

Preferably, a rearmost position of the stop position adjusted by the stopper position adjusting part is a position distant from the closed position by a distance equal to or longer than four times a diameter of the tip end opening.

As the stopper position adjusting part, the stopper part has a rod screwed into a body of the dispenser in an axial direction. A position of the rod in the axial direction is adjusted according to an amount of being screwed in the body. The needle part is stopped, as a result of a tip end part of the rod abutting against a basal end part of the needle part.

The stopper position adjusting part may further include an electric motor disposed to rotate the rod, and the pressure adjusting step may comprise adjusting the position of the stopper part by controlling a rotation amount of the rod rotated by the electric motor.

A controller may further be provided, and in the pressure adjusting step, the controller may control the electric motor so that the discharge pressure is pressure within the pressure range.

Further, the stopper position adjusting part may have a mechanism that makes the rod manually rotatable, and a display unit that displays the discharge pressure corresponding to the position of the stopper part may further be provided.

Preferably, in the position distant rearward from the closed position by a distance four times the diameter of the tip end opening, the inside diameter of the flow path is 1.1 to 3 times larger than the diameter of the tip end opening.

The mechanical foaming device may include: a gas conduit used for transporting the gas; a material conduit used for transporting the paste material; a connection part to which the gas conduit and the material conduit are connected; a mixing part that mixes together the gas and the paste material coming out of the connection part; a gas pressure control device that controls pressure of the gas forwarded to the mixing part through the gas conduit; a constant flow amount device that keeps constant a flow amount of the mixture of the gas and the paste material mixed by the mixing part; and the dispenser that receives a supply of the mixture of the gas and the paste material coming out of the constant flow amount device.

The connection part according to a first mode is at least one piston pump, the gas conduit and the material conduit are connected to a cylinder of the piston pump, and into a cylinder space formed by raising a piston of the piston pump, the gas transported through the gas conduit and the paste material transported through the material conduit are supplied, and the gas and the paste material in the cylinder space are pumped forward to the mixing part as a result of lowering the piston.

The connection part according to a second mode is a part in which the gas conduit is connected to the material conduit via a piston pump and an opening/closing valve, and into a cylinder space formed by raising a piston of the piston pump while the opening/closing valve is closed, the gas transported through the gas conduit is supplied, and the gas in the cylinder space is compressed as a result of lowering the piston, and the compressed gas is mixed into the paste material transported through the material conduit as a result of opening the opening/closing valve.

The connection part according to a third mode is a part in which the gas conduit is connected to the material conduit via a pulse valve, gas compressed to have pressure higher than pressure of the paste material in the material conduit is mixed, via the pulse valve, into the paste material transported through the material conduit, and an amount of gas introduced from the gas conduit to the material conduit is controlled by controlling the pulse valve.

BRIEF DESCRIPTION OF DRAWINGS

FIG. 2A shows a state in which the stop position of a needle part defined by the stopper part is retreated to be farthest from the tip end. FIG. 2B shows a state in which the stop position of the needle part defined by the stopper part is advanced to be closest to the tip end.

FIGS. 7A and 7B are schematic drawings of an electric stopper position adjusting part that adjusts the position of a stopper part according to an embodiment of the present invention. FIG. 7A is a side view of the electric stopper position adjusting part. FIG. 7B is an exploded perspective view of the electric stopper position adjusting part.

DESCRIPTION OF EMBODIMENTS

The following will describe a dispenser according to one embodiment of the present invention, with reference to the drawings.

Figure 1:
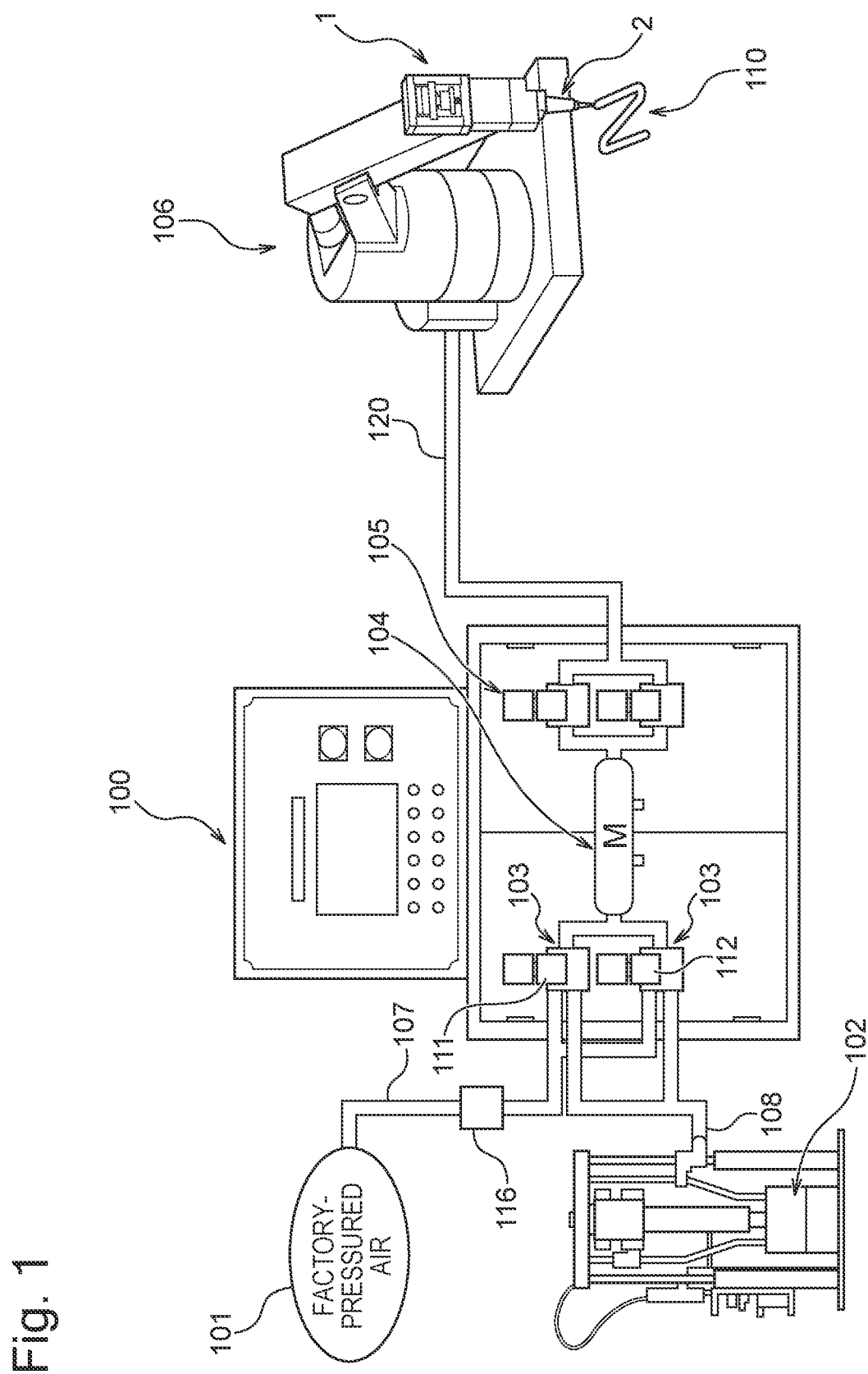
FIG. 1 is an overall schematic drawing of a mechanical foaming device that uses a dispenser according to an embodiment of the present invention.

FIG. 1 shows an example of a mechanical foaming device 100 that applies foam beads 110 to a surface by using a dispenser 1 according to the one embodiment of the present invention.

The mechanical foaming device 100 includes: a gas conduit 107 transporting gas supplied from a gas supply source 101 (e.g., a compressor (factory-pressured air) or a gas tank); a material conduit 108 transporting a paste material supplied from a paste material supply source 102 (e.g., a pail pump); a gas pressure control device 116 that controls pressure of the gas supplied from the gas supply source 101; a connection part 103 to which the gas conduit 107 and the material conduit 108 are connected; a mixer 104 that mixes together the gas and the paste material coming out of the connection part 103; a constant flow amount cylinder 105 that causes a flow of the mixture formed by the mixer 104 to be in a constant flow amount; and a supply conduit 120 connected to the exit of the constant flow amount cylinder 105. Although the gas pressure control device 116 may be a regulator in an example, the present invention is not limited to this example.

Further, the mechanical foaming device 100 includes a robot 106 and the dispenser 1 having a nozzle part 2 and being attached to an arm of the robot 106. The dispenser 1 discharges, from the nozzle part 2, the mixture of the gas and the paste material supplied from the constant flow amount cylinder 105, through the supply conduit 120. The discharged mixture is foamed and applied to the surface. As a result of the robot 106 moving the dispenser 1 along a controlled track during the discharge from the nozzle part 2, a foamed body applied from the nozzle part 2 forms the foam beads 110 on the surface.

As shown in FIG. 1, the connection part 103 in one mode includes, for example, two piston pumps 111 and 112 and is structured by connecting the gas conduit 107 and the material conduit 108 to each of the cylinders of the piston pumps 111 and 112. In the connection part 103, to cylinder spaces formed by raising the pistons of the piston pumps 111 and 112, the gas transported from the gas conduit 107 and the paste material transported from the material conduit 108 are sequentially supplied (in no particular order). As a result of lowering the pistons, the gas and the paste material in the cylinder spaces are pumped forward to the mixer 104. As a result of operating the two piston pumps 111 and 112 alternately, the mixture is incessantly supplied to the mixer 104. It is therefore possible to continuously discharge the beads 110 from the dispenser 1.

The connection part 103 in the abovementioned mode of the present invention does not necessarily need to have two piston pumps. It is acceptable to use one piston pump or three or more piston pumps.

Further, the mixer 104 may be a dynamic mixer or a static mixer. Alternatively, it is also acceptable to use a simple pipe without using a mixer. The reason is that, even in the pipe, bubbles of the gas are micro-dispersed while the material is being transported through the pipe, and it is possible to form a mixture in which the bubbles are dispersed in the material.

Figure 9:
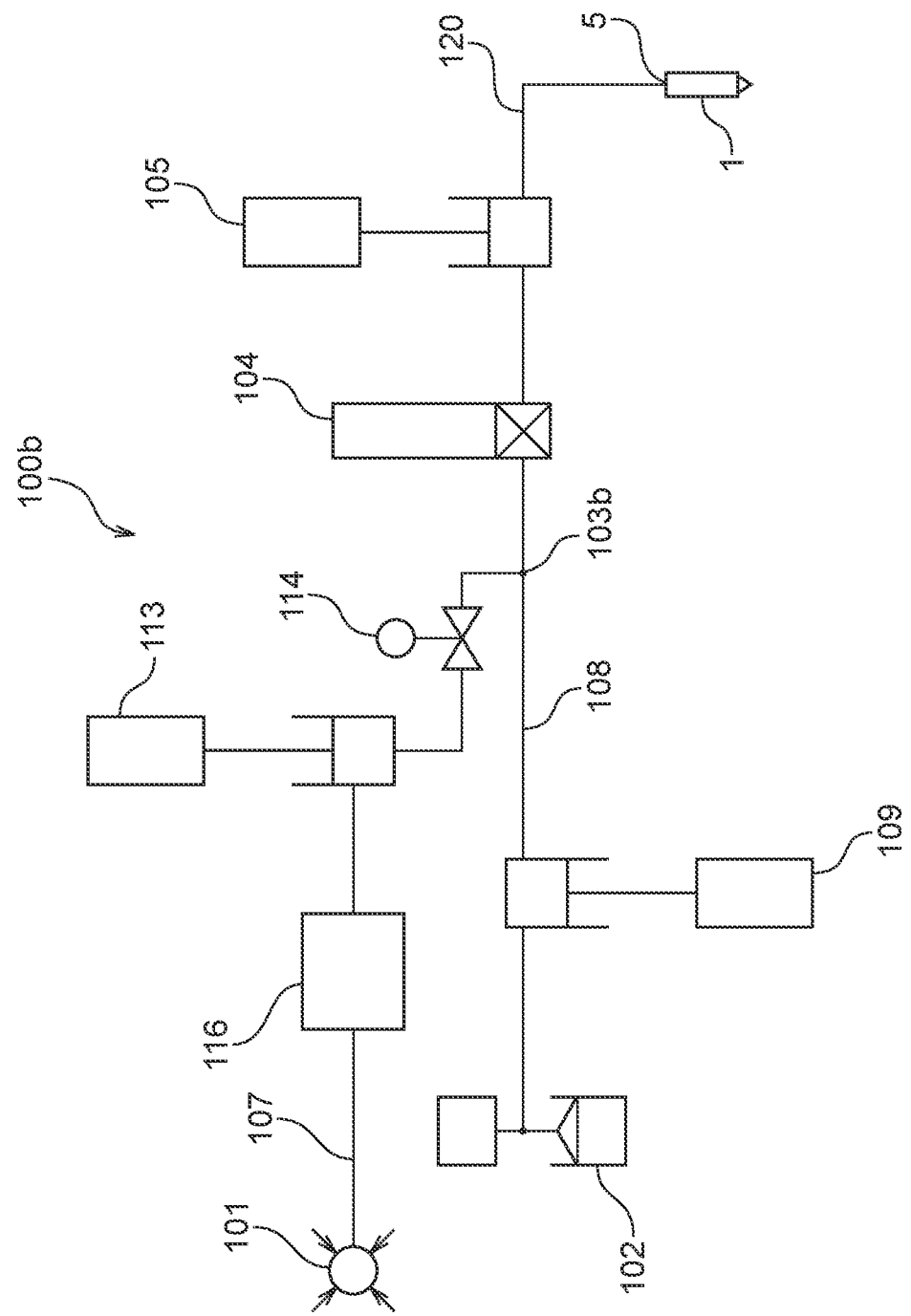
FIG. 9 is a schematic drawing showing another mode of the connection part of the mechanical foaming device shown in FIG. 1.

FIG. 9 shows a mechanical foaming device 100b according to another mode of present invention. In FIG. 9, some of the constituent elements that are the same as those in the mechanical foaming device 100 in FIG. 1 will be referred to by using the same reference characters, and detailed explanations thereof will be omitted.

As shown in FIG. 9, as compared to the mechanical foaming device 100 in FIG. 1 in which the connection part is provided with a piston pump, a connection part 103b of the mechanical foaming device 100b is different for being structured as a connection point at which the gas conduit 107 is connected to the material conduit 108 via a piston pump 113 and an opening/closing valve 114. In the mode shown in FIG. 9, into the cylinder space formed by raising the piston of the piston pump 113 while the opening/closing valve 114 is closed, the gas transported from the gas conduit 107 is forwarded, the gas having been pressure-controlled by a gas pressure control device 116. Subsequently, by lowering the piston, the gas in the cylinder space is compressed. As a result of opening the opening/closing valve 114, the compressed gas is mixed, at the connection part 103b, into the paste material being transported through the material conduit 108. Because the pressure of the gas at the time of being mixed is increased by the piston pump 113 to a pressure level higher than that of the paste material, it is possible to prevent the paste material from flowing backward to the piston pump 113, and it is possible to have the gas mixed into the flowing paste material.

Because the cylinder space formed at the time of raising the piston of the piston pump 113 has a prescribed capacity, it is possible to keep constant the amount of the gas to be mixed into the paste material at the time of lowering the piston, by adjusting the amount of the gas forwarded by the gas pressure control device 116 so that the pressure of the gas in the cylinder space is at a prescribed level. In this situation, by further keeping constant the flow amount of the paste material flowing through the material conduit 108 by using a constant flow amount pump 109, it is possible to control the proportion between the amount of the paste material and the amount of the gas to be constant and to thus achieve a desired foam expansion ratio. In this situation, it is also possible to control the proportion between the amount of the paste material and the amount of the gas to be constant, by measuring the flow amount of the paste material flowing through the material conduit 108 and adjusting the gas amount in accordance with the flow amount of the paste material. Further, the flow amount of the paste material forwarded by the constant flow amount pump 109 may fluctuate, as long as the ratio between a total amount of the paste material and a total amount of the gas to be mixed therewith in a certain period of time is substantially constant. Alternatively, control may be exercised to substantially achieve a certain target value.

Figure 10:
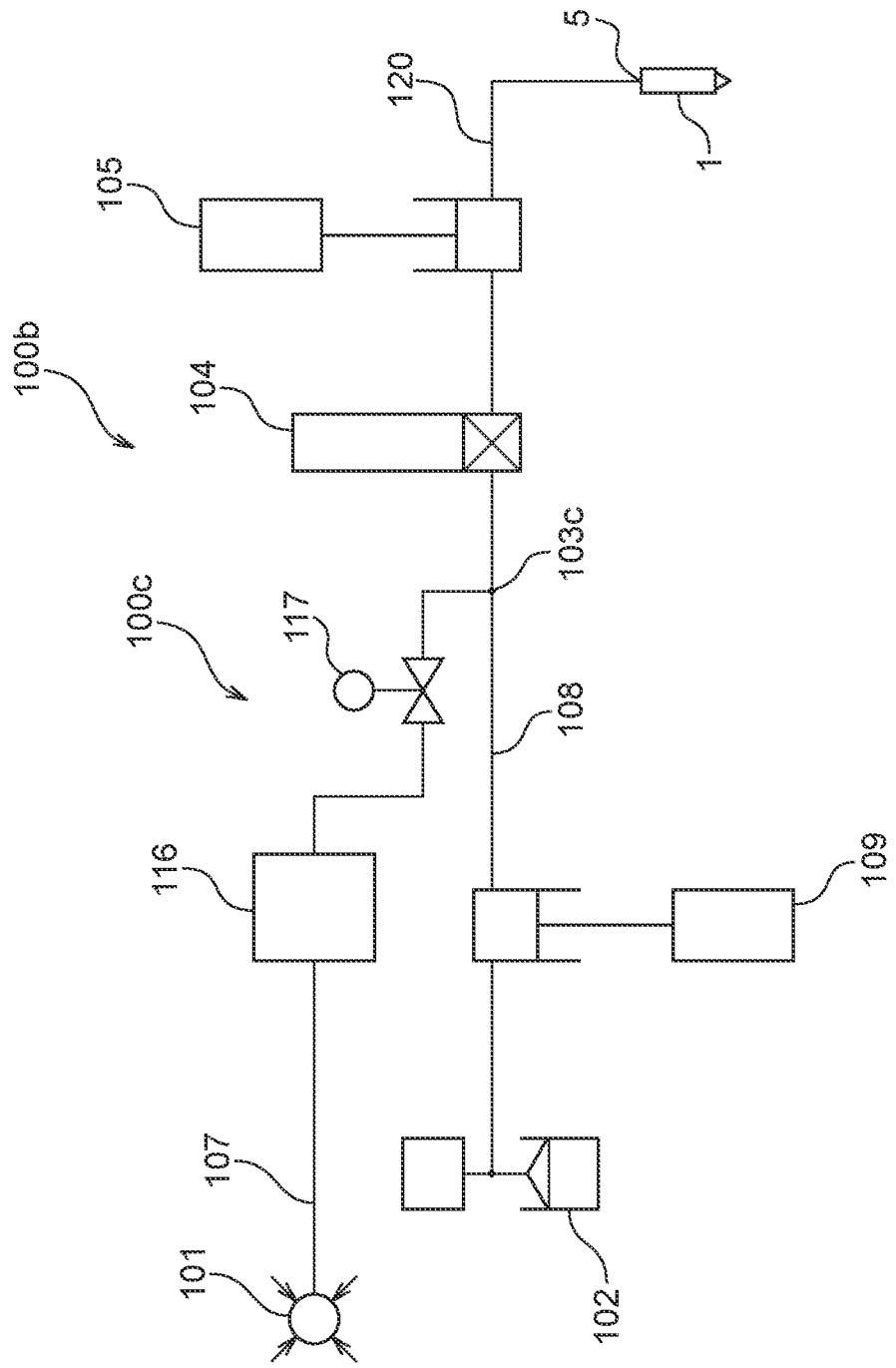
FIG. 10 is a schematic drawing showing yet another mode of the connection part of the mechanical foaming device shown in FIG. 1.

FIG. 10 shows a mechanical foaming device 100c according to yet another mode of the present invention. In FIG. 10, some of the constituent elements that are the same as those in the mechanical foaming device 100 or 100b in FIG. 1 or FIG. 9 will be referred to by using the same reference characters, and detailed explanations thereof will be omitted.

The mechanical foaming device 100c in FIG. 10 is the same as the mechanical foaming device 100b in FIG. 9 in that the connection part 103c is structured as the connection point between the gas conduit and the material conduit, but is different for not having the piston pump 113, which is provided in the mechanical foaming device 100b in FIG. 9. In the mechanical foaming device 100c, in place of the piston pump 113, as means for making the pressure of the gas supplied at the connection part 103 higher than the material pressure, a high pressure gas tank is used as the gas supply source 101 or gas pressure adjusting/increasing means (not shown) is used, for example.

Further, in the mechanical foaming device 100c in FIG. 10, although it is acceptable to use the opening/closing valve 114 provided in the mechanical foaming device 100b shown in FIG. 9 without any modification, it is also acceptable, in another preferable mode, to configure the opening/closing valve 114 as a needle- or ball-type pulse valve 117 so as to control the introduction of the gas. In this mode, it is possible to control the amount of the introduced gas per session or the amount of the introduced gas per time period, by adjusting the stroke of the needle of the pulse valve 117, adjusting the frequency with which the needle is opened and closed, or the like.

Further, with respect to the mechanical foaming device 100c in FIG. 10, another mode is also acceptable in which the pressure before the pulse valve 117 and the material pressure at the connection part 103c are measured and set, so as to control the amount of the introduced gas. In other words, in the mode shown in FIG. 10, it is possible to control the amount of the introduced gas on the basis of any of the following: (1) differential pressure between the pressure before the pulse valve 117 and the material pressure at the connection part 103c; (2) the flow amount of the paste material in the material conduit 108 and the supply amount of the gas; and (3) the settings (the opening degree, the frequency, and the number of times) of the pulse valve 117. It is also possible to control the amount of the introduced gas on the basis of a combination made up of two selected from among (1), (2), and (3) or all of (1), (2), and (3).

Further, in the mechanical foaming devices 100b and 100c, the constant flow amount pump 109 may be provided either on the upstream side or the downstream side of the connection part 103b, 103c. Further, with the mechanical foaming device 100b shown in FIG. 9, it is also possible to realize the operation described above, by using the pulse valve 117 shown in FIG. 10 in place of the opening/closing valve 114 and using the piston pump 113 as pressure increasing means.

Next, a configuration of the dispenser 1 will be explained, with reference to FIGS. 2A and 2B.

Figure 2A:
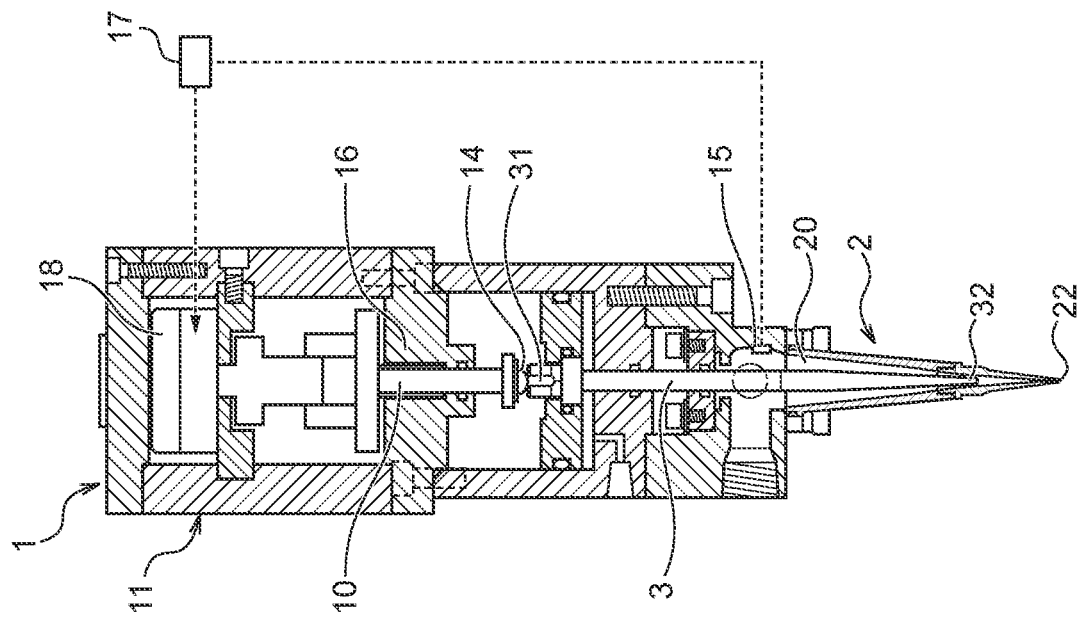
FIGS. 2A and 2B are cross-sectional side views of the dispenser shown in FIG. 1.

As show in FIG. 2A, the dispenser 1 includes a body 11 and the nozzle part 2 attached to a tip end part of the body 11.

The nozzle part 2 has formed therein a hollow space 20 penetrating from the basal end to the tip end of the nozzle part 2. As a result, a basal end opening 21 is formed at the basal end of the nozzle part 2, while a tip end opening 22 is formed at the tip end of the nozzle part 2. Further, on the inner surface of the nozzle part 2, a tapered section 23 is formed in which the inside diameter of the hollow space 20 on each cross-sectional plane perpendicular to the axial direction decreases toward the tip end opening 22. In the hollow space 20 of the nozzle part 2, the needle part 3 is inserted. As explained later, as a result of the needle part 3 moving up and down on the inside of the hollow space 20, the nozzle part 2 is opened and closed.

Figure 3:
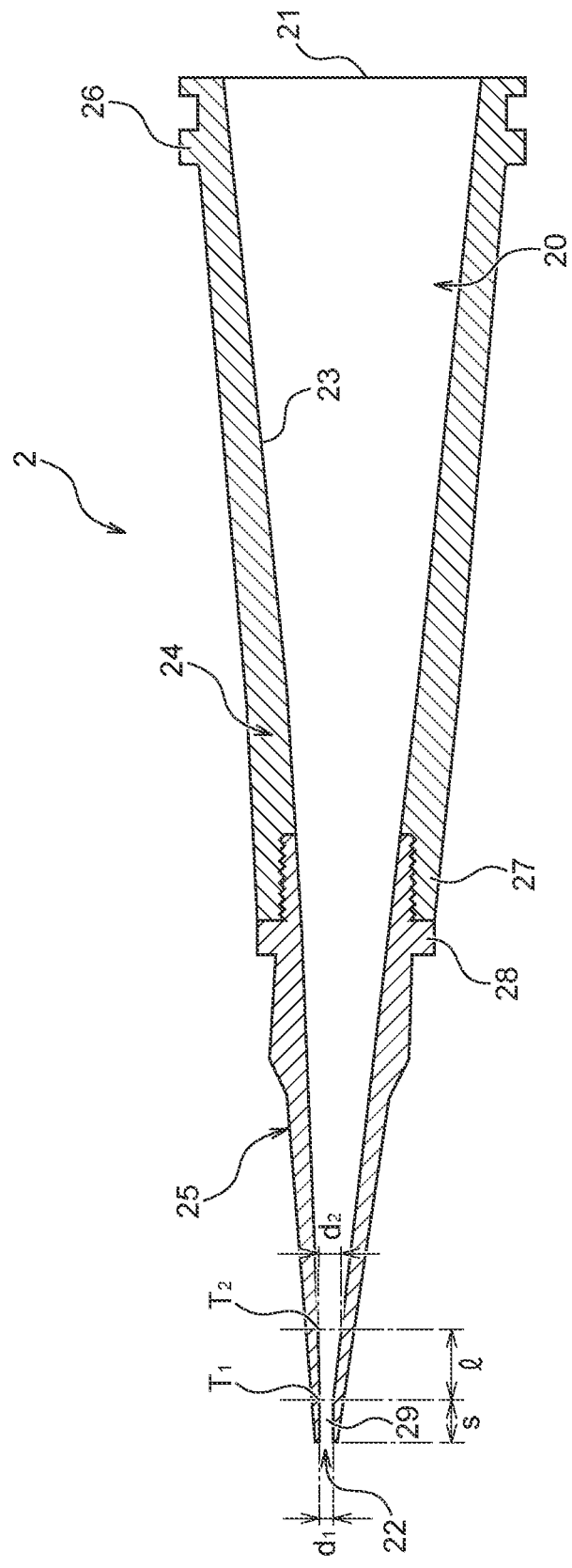
FIG. 3 is a cross-sectional side view of a nozzle (a first modification example) connected to the dispenser shown in FIG. 1.

As shown in FIG. 3 in detail, the nozzle part 2 is structured by connecting a nozzle body 24 and a nozzle tip end part 25 to each other by using respective engagement parts 27 and 28 thereof. This configuration makes it possible to replace the nozzle tip end part 25 as necessary. (For example, it is possible to replace the nozzle tip end part 25, as necessary, with a nozzle tip end part having the length of 0.6 mm, 0.8 mm, 1.0 mm, 1.2 mm, 1.4 mm, or the like.) The nozzle body 24 and the nozzle tip end part 25 have tapered sections having mutually the same inclination rate (the rate of change of the inside diameter with respect to the length in the axial direction), so that the tapered section 23 having the same inclination rate as a whole is formed by smoothly connecting the inner surfaces to each other. Needless to say, the present invention is not limited to this example. Possible structures of the nozzle part 2 include one in which the nozzle body 24 and the nozzle tip end part 25 are integrally formed. Alternatively, as explained in detail later, the inclination rate of the tapered section 23 may vary among different locations.

At the basal end of the nozzle body 24, the abovementioned basal end opening 21 is formed. On the outer circumference of the basal end, an engagement part 26 for attaching the nozzle part 2 while being engaged with the body 11 of the dispenser 1 is formed. At the farthest tip end of the nozzle tip end part 25, a discharge port 29 having the tip end opening 22 is formed. The inner surface of the discharge port 29 is formed to have an inside dimeter that is equal, in the whole length thereof, to the inside diameter of the tip end opening 22. In other words, the tapered section 23 ends at the most rearward edge of the inner surface of the discharge port 29.

Figure 4:
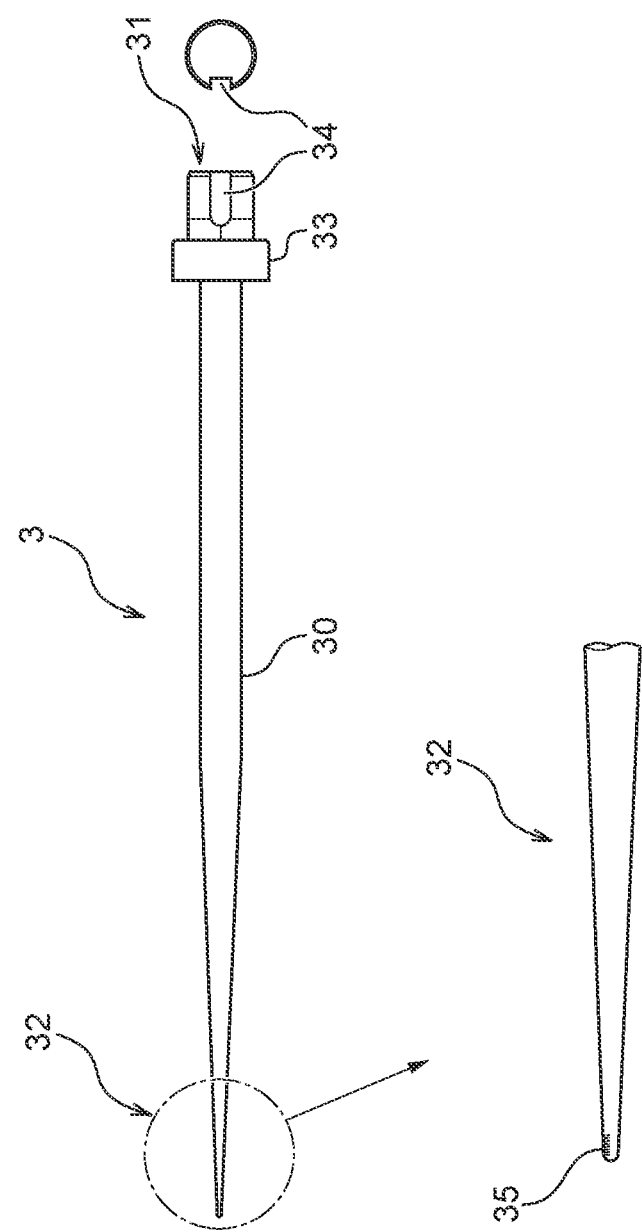
FIG. 4 is a side view of a needle part used with the nozzle (the first modification example) shown in FIG. 3 and an enlarged view of a tip end part of the needle part.

The needle part 3 for opening and closing the nozzle part 2 includes, as shown in FIG. 4 in detail, a needle body 30, a basal end part 31, a tip end part 32 formed in a tapered shape, and a large diameter part 33 formed in the vicinity of the basal end part 31. The basal end part 31 has an axial-direction groove 34 formed therein. As a result of a projection (not shown) of a piston part 8 being fitted in the axial-direction groove 34, it is possible to attach the needle part 3, without turning, to the piston part 8 during the operation of the needle.

The diameter of a tip end 35 (in the vicinity of the farthest tip end) of the tip end part 32 is formed to be equal to the inside diameter of the discharge port 29 or to be equal to the inside diameter of the tapered section 23 positioned in the vicinity of the discharge port 29. Accordingly, when the needle part 3 is inserted in the hollow space 20 of the nozzle part 2 and advanced, the tip end 35 of the needle part 3 is engaged in a closed position T1 (FIG. 3) on the inner wall of the tapered section 23 (including the boundary between the tapered section 23 and the discharge port 29), and at that time, the nozzle part 2 is closed (the state shown in FIGS. 2A and 2B). From this state, when the needle part 3 is retreated, because the tip end 35 of the needle part 3 moves away from the closed position T1 (FIG. 3), the nozzle part 2 is opened. In this situation, the closed position T1 (FIG. 3) may be set either in the vicinity of the boundary between the tapered section 23 and the discharge port 29 or inside the tapered section 23 positioned behind the discharge port 29, in accordance with the diameter of the tip end 35 of the needle part 3 and the inside diameter of the tapered section 23.

In the nozzle part 2 according to the present embodiment, the inclination rate of the tapered section 23 is determined in such a manner that, as shown in FIG. 3, the inside diameter d2 in a position T2 distant rearward from the closed position T1 by a distance 1 four times the diameter d1 of the tip end opening 22 is approximately 1.6 times larger than the diameter d1 of the tip end opening 22.

Returning to the description of FIG. 2A, the body 11 of the dispenser 1 includes: an introduction port 5 through which the mixture of the gas and the paste material that has come through the supply conduit 120 shown in FIG. 1 is introduced; and a passage 6 extending from the introduction port 5 to the inside of the body 11. The passage 6 is linked to the basal end opening 21 of the nozzle part 2 and is connected from the introduction port 5 via the passage 6 through the hollow space 20 of the nozzle part 2 to the tip end opening 22, so that a flow path 4 for the mixture is formed in the dispenser 1, extending from the introduction port 5 to the tip end opening 22.

Further, the body 11 includes: a support part 19 that slidably supports the needle part 3 in a hermetic state; a cylinder part 7 formed behind (above in the drawing) the support part 19; the piston part 8 that moves up and down within the cylinder part 7; and a compressed air port 9 through which compressed air is put into and taken out of the space formed between the piston part 8 and the bottom face of the cylinder part 7. With the piston part 8, the large diameter part 33 formed in the vicinity of the basal end of the needle part 3 is fitted, so that the basal end part 31 of the needle part 3 protrudes upward from the piston part 8. The piston part 8 is biased downward by a spring (not shown) toward the position shown in FIG. 2A, and in that state, the needle part 3 is closing the flow path 4 of the nozzle part 2. Alternatively, instead of the spring, the piston part 8 may be biased downward by compressed air pumped into the space in the cylinder part 7 positioned above the piston part 8.

Through the compressed air port 9, when the compressed air is pumped into the space formed between the piston part 8 and the bottom face of the cylinder part 7, the piston part 8 rises against the spring force due to the pressure from the compressed air. In conjunction with the rise, the needle part 3 fitted with the piston part 8 also rises, so that the tip end of the nozzle part 2 moves away from the closed position T1, which makes a transition from the closed state shown in FIG. 2A to an open state. After that, when the air in the space formed between the piston part 8 and the bottom face of the cylinder part 7 is released through the compressed air port 9, the piston part 8 falls due to the spring (not shown). In conjunction with the fall, the needle part 3 also falls so as to close the tip end opening 22 of the nozzle part 2. By moving the needle part 3 up and down in this manner, it is possible to open and close the tip end opening 22 of the nozzle part 2, i.e., to open and close the flow path 4.

When the mixture of the gas and the paste material is supplied through the introduction port 5, the mixture passes through the flow path 4 and reaches the vicinity of the tip end opening 22 of the nozzle part 2. When the needle part 3 has retreated upward to open the tip end opening 22, the mixture is discharged from the tip end opening 22 and is applied to the surface as a foamed body. When the needle part 3 is moved downward, because the tip end of the needle part 3 closes the tip end opening 22, the flow path 4 is closed so that the mixture stops being discharged.

Further, provided above the cylinder part 7 is a stopper support part 16 that defines the top face of the cylinder part 7. The stopper support part 16 has formed therein a penetrating hole 16a extending in the axial direction. A screw thread is formed on the inner surface of the penetrating hole 16a. A rod 10 on which a screw thread 10a is formed is screwed into the penetrating hole 16a. A tip end part 14 of the rod 10 protrudes into the cylinder part 7. When the needle part 3 is raised by a prescribed distance, the basal end part 31 of the needle part 3 abuts against the tip end part 14 of the rod 10 and stops the needle part 3 from rising further. In other words, the stopper support part 16, the rod 10, and the tip end part 14 thereof function as a stopper that restricts the operation range of the needle part 3.

It is possible to change the position of the rod 10 in the axial direction in accordance with the amount (hereinafter, "screw-in amount") by which the stopper support part 16 is screwed into the penetrating hole 16a. Accordingly, it is possible to adjust the operation range of the needle part 3 in accordance with the screw-in amount of the rod 10. It can be observed that, as shown in FIG. 2B, by making the screw-in amount of the rod 10 larger than that shown in FIG. 2A so as to move the tip end part 14 of the rod 10 further downward, it is possible to further restrict the operation range of the needle part 3. The rod 10 thus restricts the movable range of the tip end 35 (FIG. 4) of the needle part 3 to be the range from the closing position T1 (FIG. 3) to the stop position T2 (FIG. 3) distant rearward from the closing position T1 by the distance 1. Preferably, the distance 1 is equal to or longer than four times the diameter d1 of the tip end opening 22.

Figure 2B:
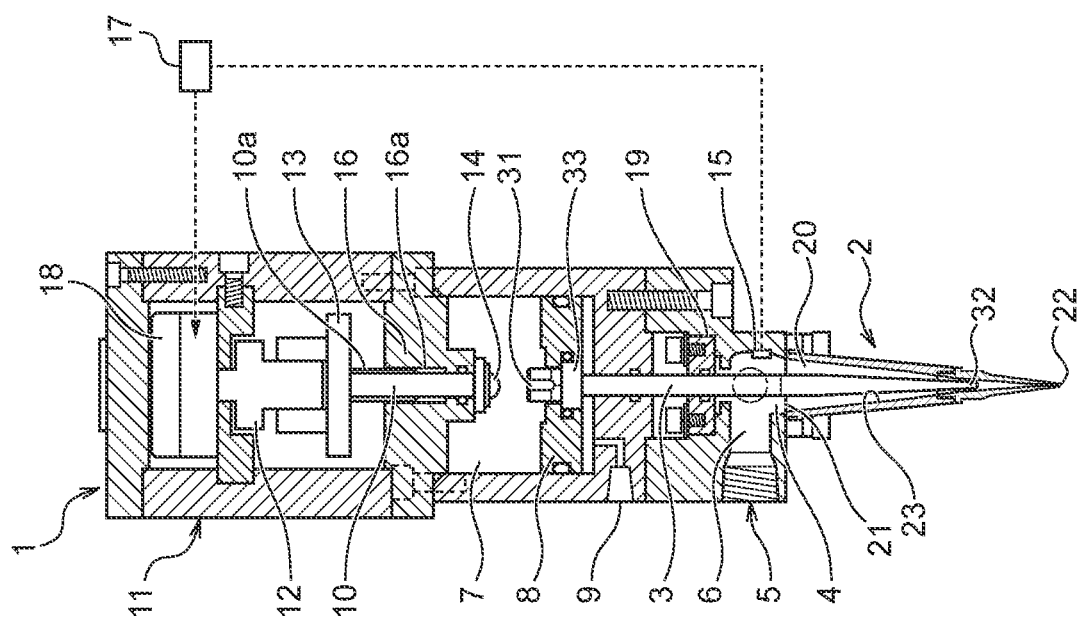

The screwing of the rod 10, i.e., the adjustment of the operation range of the needle part 3 may be performed manually; however, in the present embodiment, an electric stopper position adjusting part is employed as shown in FIGS. 2A and 2B. In other words, the electric stopper position adjusting part includes an electric motor part 18 and is configured to transmit the rotation of the electric motor part 18 to a basal end part 13 of the rod 10 via a rotation transmitting part 12.

As shown in detail in FIGS. 7A and 7B, the electric motor part 18 includes: an electric motor 50; a reduction gear 51 that reduces the rotation speed of the electric motor 50; an output shaft 52 of the reduction gear 51; and a rotation plate 53 fitted with the output shaft 52. In the basal end part 13 of the rod 10, four cylindrical projections 54 protrude upright. The rotation transmitting part 12 (FIG. 2A) is structured as a result of fitting a plate part 55 that perpendicularly extends from a bottom part of the rotation plate 53 into the gaps between the adjacently-positioned cylindrical projections 54, so that the rotation of the output shaft 52 of the electric motor part 18 is transmitted to the rod 10.

Further, the dispenser 1 further includes a controller 17 that controls the electric motor part 18 so as to adjust the position of the tip end part 14 of the rod 10, i.e., the operation range of the needle part 3 (3b). Although the controller 17 is arranged in a control panel of the mechanical foaming device 100 in FIG. 1, the present invention is not limited to this example.

Also, the dispenser 1 further includes a pressure sensor 15 used for detecting "discharge pressure" of the mixture discharged from the nozzle part 2. A pressure detection signal from the pressure sensor 15 is sent to the controller 17, so that the controller 17 is able to use the pressure detection signal, i.e., the pressure in the flow path 4, for controlling the electric motor part 18. To make it easy to measure the pressure, a preferable installation position of the pressure sensor 15 is a position within the pipe connected to the introduction port 5 of the dispenser 1, before the introduction port. In other words, in the present embodiment, the pressure detected in the position before the introduction port 5 is regarded as the "discharge pressure". In actuality, the pressure of the mixture is subject to pressure loss between when the mixture is introduced to the introduction port 5 and when the mixture is discharged from the nozzle tip end part 25; however, while in the passage 6 extending to the entrance part of the nozzle body 24, because the length of the passage is short and the cross-sectional area of the passage is not so small, the pressure loss is not so large. In contrast, after the entrance part of the nozzle body 24, because the diameter becomes relatively narrower so as to have the passage tapered, the pressure loss of the mixture increases while flowing through the nozzle part 2 until being discharged. Accordingly, the "discharge pressure" detected by the pressure sensor 15 in the position before the introduction port 5 corresponds to the pressure in the vicinity of the entrance of the nozzle body 24. However, it would be difficult to install the pressure sensor 15 inside the nozzle body 24, and it would also be difficult to convert the pressure at the tip end opening 11, the present embodiment is configured so as to use the pressure in the position before the introduction port 5 as the "discharge pressure" and to exercise control based on the discharge pressure.

Figure 5:
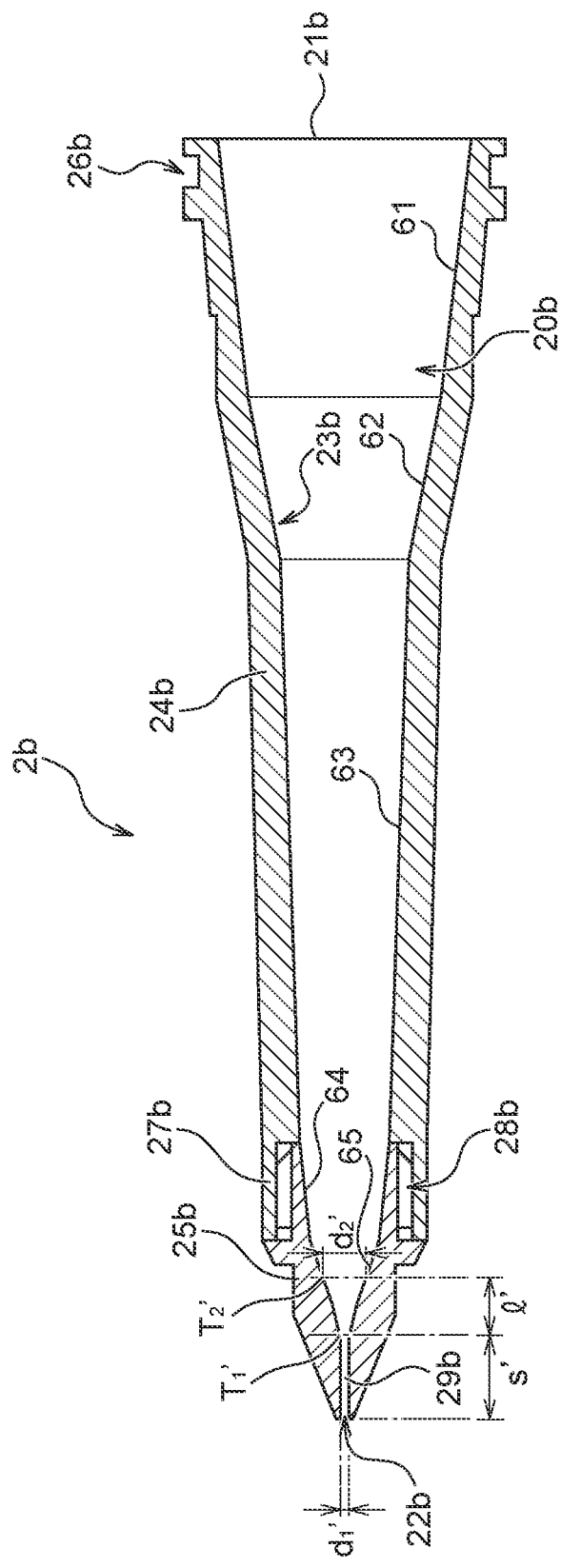
FIG. 5 is a cross-sectional side view of another nozzle (a second modification example) connectable to the dispenser shown in FIG. 1.
Figure 6:
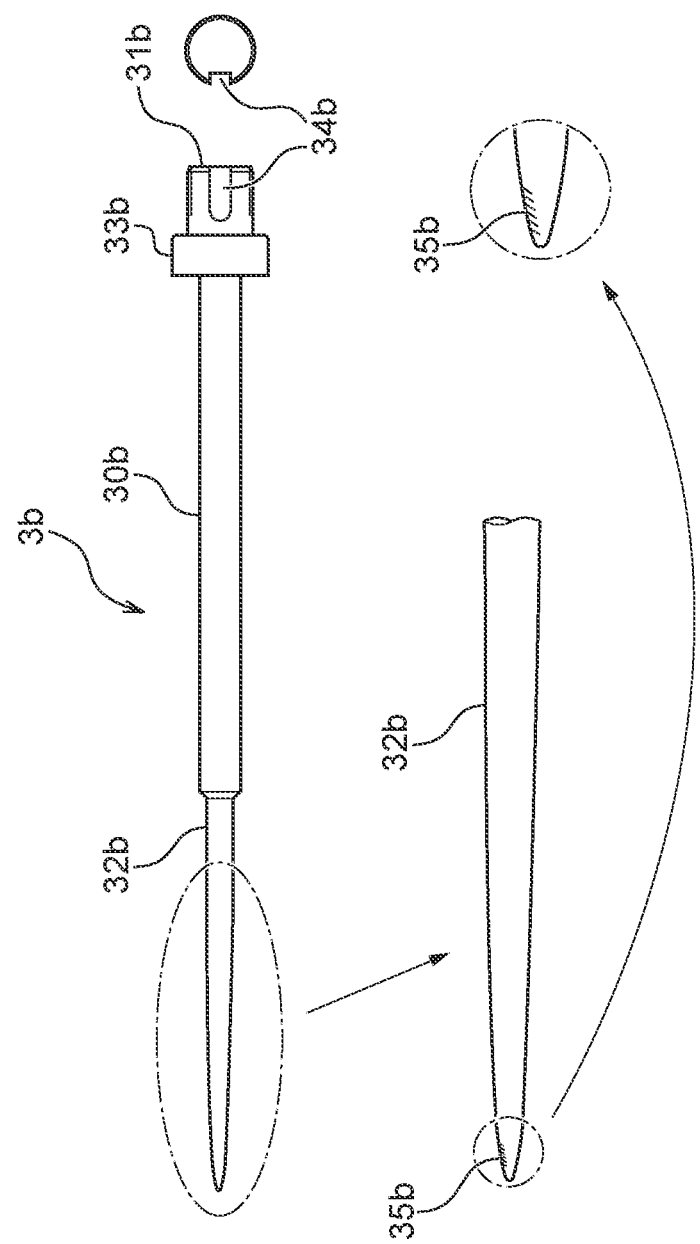
FIG. 6 is a side view of a needle part used with the nozzle (the second modification example) shown in FIG. 5 and an enlarged view of a tip end part of the needle part.

In this situation, from the viewpoint of easily installing the pressure sensor, it is also an option to install the pressure sensor further upstream inside the conduit 120 shown in FIG. 1, instead of the position before the introduction port 5. In that situation, pressure loss is measured on the basis of the length and the diameter of the conduit 120, so as to convert the detected pressure into pressure at the material introduction port 5, i.e., the "discharge pressure". Further, when a mechanism that controls the pressure such as a regulator is provided in a position rearward from the discharge pressure measuring point, the conversion into the "discharge pressure" shall be carried out while also taking the pressure loss thereof into account. The nozzle part 2 and the needle part 3 have thus been described as embodiments of the present invention; however, the present invention is not limited to these examples. Next, while the nozzle part 2 and the needle part 3 described above are regarded as a first modification example, a nozzle part and a needle part according to a second modification example will be explained, with reference to FIGS. 5 and 6. In FIGS. 5 and 6, some of the constituent elements that are the same as those in the first modification example will be referred to by appending the letter "b" to the same reference numerals. Detailed explanations of those elements will be omitted, and the following will primarily describe differences.

As shown in FIG. 5, in a nozzle part 2b according to the second modification example, a tapered section 23b is formed with a plurality of tapered subsections 61, 62, 63, 64, and 65 having mutually-different inclination rates, which is different from the nozzle part 2 according to the first modification example. A needle part 3*b* shown in FIG. 6 is inserted in a hollow space 20*b* of the nozzle part 2*b*. Similarly to the needle part 3 in the first modification example, the needle part 3*b* includes a needle body 30*b*, a basal end part 31*b*, a tip end part 32*b* formed in a tapered shape, and a large diameter part 33*b* formed in the vicinity of the basal end part 31*b*. A difference from the first modification example lies in that there is a step between the needle body 30*b* and the tip end part 32*b*.

In the nozzle part 2*b* according to the second modification example, as shown in FIG. 5, the inclination rate of the tapered section 23*b* (the tapered subsection 65 in the example in FIG. 5) is determined in such a manner that the inside diameter d2' in a position T2' distant rearward from a closed position T1' by a distance P' four times the diameter d1' of the tip end opening 22*b* is approximately 2.9 times larger than the diameter d1' of the tip end opening 22*b*. In other words, in the second modification example, d2'/d1'=2.9 is satisfied, in contrast to d2/d1=1.6 in the first modification example. When the diameter of the tip end opening is equal, the inclination rate of the tapered section is larger in the second modification example. In an embodiment of the present invention, a preferable range of the inclination rate d2/d1 is 1.1 to 4.

In the nozzle part 2 or 2*b*, to minimize the amount of the residual material in the nozzle at the time of the closure by the needle part, it is desirable to arrange the distance s or s' from the closed position T1 or T1' to the tip end opening 22 or 22*b* to be 2 mm or shorter. Further, to eliminate dead space, it is also acceptable to provide, at the tip end of the needle part 3, a nozzle remnant elimination projection that is able to go into the part corresponding to the distance s, or s' when the closed position is assumed.

Next, effects of one embodiment of the present invention will be explained.

A mixture in which gas and a paste material are micro-dispersed is supplied to the introduction port 5 of the dispenser 1 from the mechanical foaming device 100. The introduced mixture passes through the flow path 4 and reaches the vicinity of the tip end opening 22 (22*b*) of the nozzle part 2 (2*b*). When the dispenser 1 is brought to a discharge position, the robot 106 introduces compressed air to the cylinder part 7 through the compressed air port 9. Due to the introduced compressed air, the piston part 8 rises so that the tip end 35 (35*b*) of the needle part 3 (3*b*) moves away from the closed position T1 (T1'), and the flow path 4 reaching the stopper tip end opening 22 (22*b*) changes from the closed state to the open state. The basal end part 31 (31*b*) of the needle part 3 (3*b*) abuts against the tip end part 14 of the rod 10 and stops.

In this situation, the mixture of the material and the gas passes through the open flow path 4 and is discharged from the tip end opening 22 (22*b*) to be applied to a surface as the foam beads 110. In this situation, as for the mixture passing through the flow path 4, the material pressure on the downstream side decreases when the tip end opening 22 (22*b*) is opened, but because of the tapered section 23 (23*b*) of which the inside diameter decreases, the mixture is able to maintain relatively high pressure without drastic falls in the pressure, until immediately before being discharged. Accordingly, it is possible to keep small the foamed cells of the foamed body after being discharged, by preventing the situation where the bubbles become large due to aggregation caused by the pressure getting lower during the passing through the nozzle. Also, because the bubbles are prevented from becoming large, it is possible to inhibit the bubbles from breaking and to thus stabilize the foam expansion ratio. In other words, it is possible to apply the foam beads that have a desired foam expansion ratio and in which the bubbles are evenly dispersed. The desired foam expansion ratio is preferably 3 times or more and may be 3.5 times, 4 times, or 5 times. Further, variance of the foam expansion ratio is 10% or lower and is preferably 5%. The present invention realizes the desired foam expansion ratio and is also able to keep the variance thereof within the preferable range. Further, with the tapered section 23 (23*b*), because it is possible to maintain the pressure of the mixture relatively high until immediately before being discharged, there is no need to supply the paste material to the dispenser 1 at extremely high pressure. It is therefore possible to proactively prevent clogging of the material and reactions of the paste material before being discharged. Further, because the nozzle has the tapered shape, no splash occurs at the time of the release from the nozzle tip end part, and it is possible to apply the mixture of the gas and the material being homogenous and taking the shape of beads.

At the time of discharging the mixture of the paste material and the gas to be discharged from the dispenser 1, it is important, in order to achieve the abovementioned advantageous effect, to adjust the discharge pressure to be pressure within the pressure range of 4 MPa to 15 MPa. The pressure range may be from 5 MPa to 12 MPa, and preferably from 6 MPa to 10 MPa.

The pressure of the mixture at the time of being discharged has a certain relationship not only with the viscosity of the paste material and the discharge flow amount of the mixture, but also with a needle gap amount, which is a value indicating an operation range of the needle part 3 (3*b*). As shown in FIG. 3 (FIG. 5), the needle gap amount is the distance 1 (1') between the stop position T2 (T2) and the closed position T1 (T1') of the tip end 35 (35*b*), when the needle part 3 (3*b*) abuts against the tip end part 14 of the rod 10.

Figure 8:
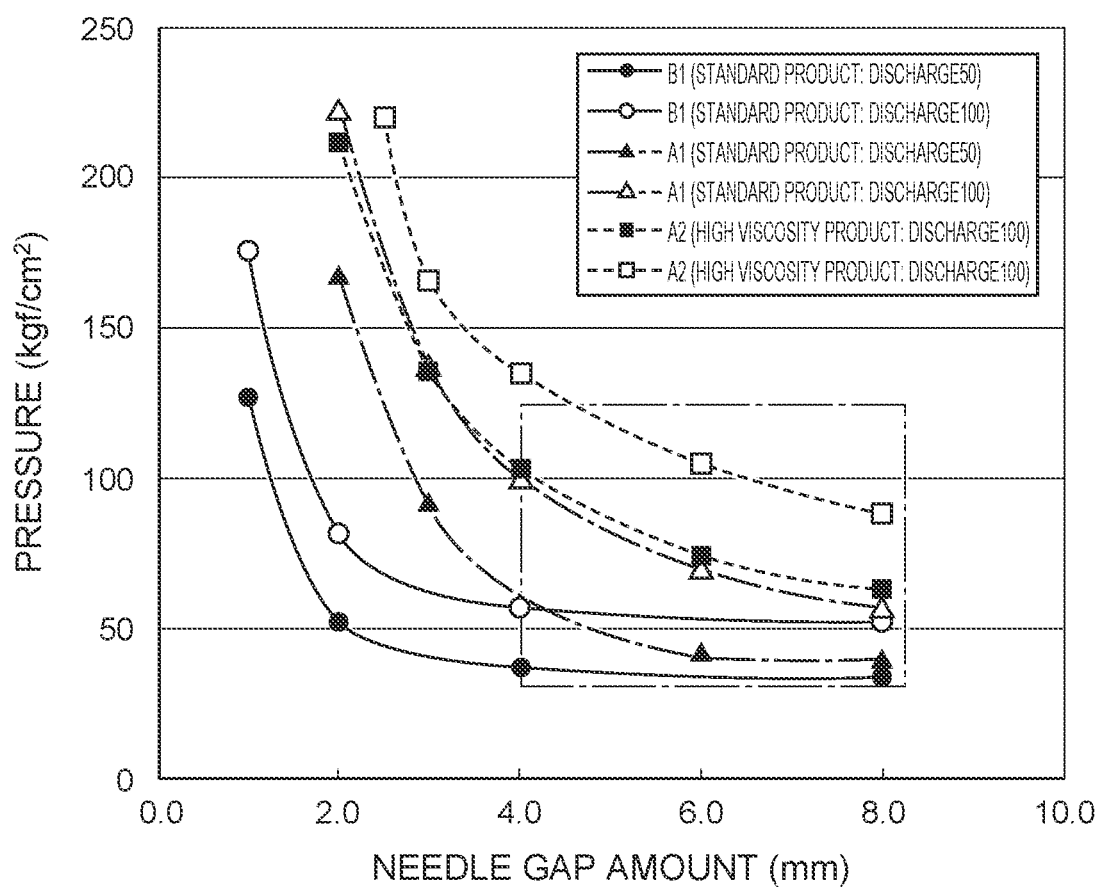
FIG. 8 is a graph showing a relationship between a needle gap amount and pressure inside a flow path of the dispenser.

FIG. 8 shows a relationship between needle gap amounts and the discharge pressure of the mixture. In FIG. 8, "A1" denotes a resultant from the first modification example (the nozzle part 2 and the needle part 3) using a standard paste material (viscosity: 80,000 mPa·s (measured shear velocity: 4.2 sec$^{-1}$)); "A2" denotes a result of the first modification example (the nozzle part 2 and the needle part 3) using a paste material having a high viscosity (viscosity: 120,000 mPa·s); and "B1" denotes a result of the second modification example (the nozzle part 2*b* and the needle part 3*b*) using the standard paste material. In the present example, the paste material having the high viscosity was obtained by slightly increasing the viscosity by leaving the standard paste material at 40° C. for approximately two weeks. Further, with A1 and B1, tests were performed with discharge flow amounts of 50 g/min and 100 g/min.

The graph in FIG. 8 indicates that, in all the dispensers, as the needle gap amount increases, the discharge pressure drastically decreases and approaches a certain level of pressure.

Figure 11:
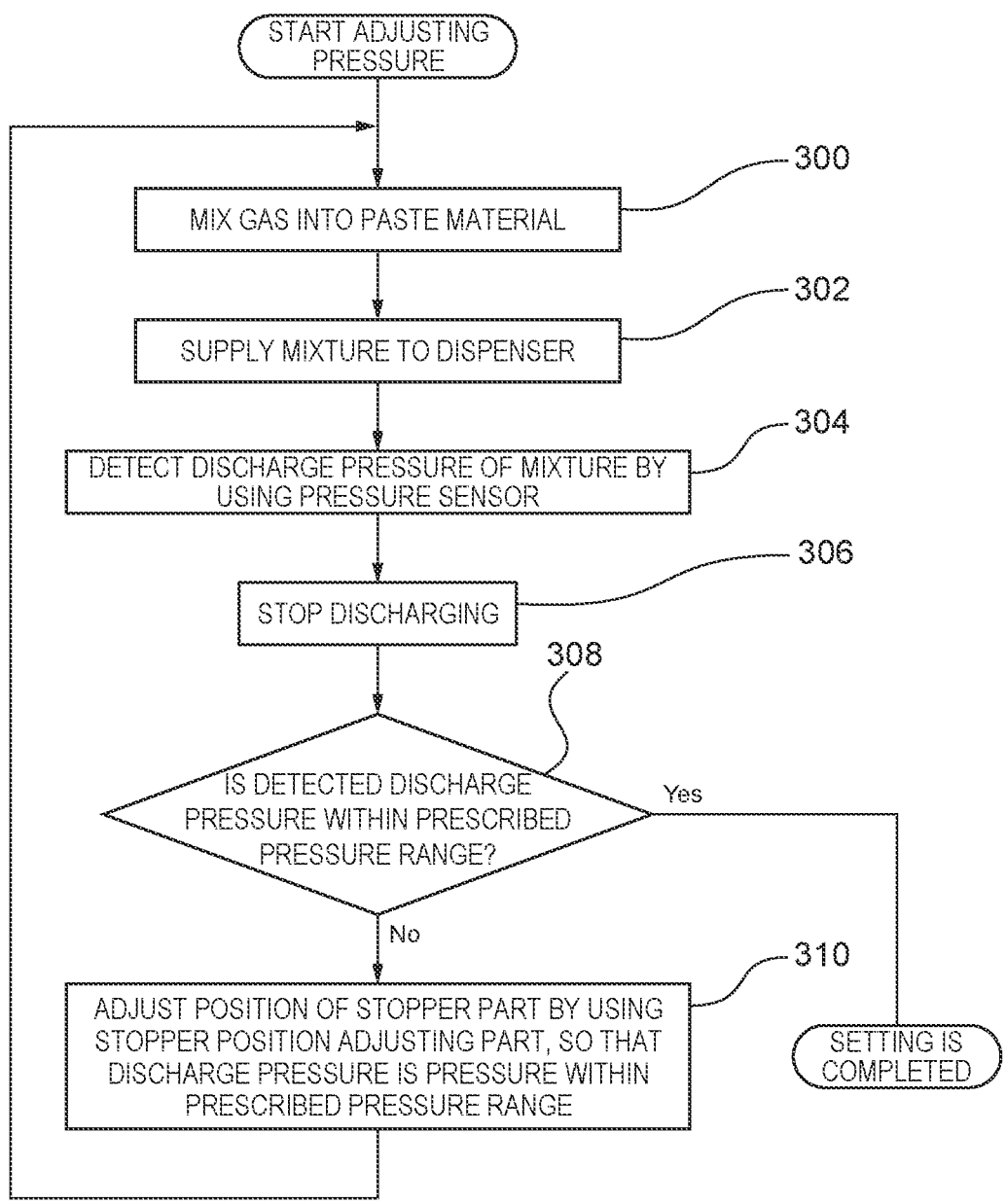
FIG. 11 is a flowchart showing a method for adjusting pressure of a mixture discharged from the dispenser according to an embodiment of the present invention.

Accordingly, it means that, with respect to a given set of a paste material and a discharge flow amount, the needle gap amount of the needle part 3 (3*b*) should be adjusted so as to achieve a desirable level of pressure that will exert the abovementioned advantage effect with the used dispenser. A method that uses this principle for adjusting the pressure of the mixture of the paste material and the gas discharged from the dispenser 1 will be explained in detail, with reference to the flowchart in FIG. 11. FIG. 11 shows, not the process at the time of producing the foamed body, but the process for checking the discharge pressure at the preceding stage, which is the needle gap amount adjusting process performed for having the discharge pressure contained within the prescribed range, as necessary.

As shown in FIG. 11, the mechanical foaming device 100 mixes the gas into the paste material (step 300), and the mixture is supplied to the dispenser 1 as described above (step 302), so that the pressure sensor 15 provided in the position before the introduction port 5 detects the pressure of the mixture (step 304). Alternatively, when the pressure sensor 15 is positioned further upstream inside the conduit 120 shown in FIG. 1, instead of in the position before the introduction port 5, the detected pressure is converted, as explained above, into pressure in the vicinity of the introduction port 5, while taking into consideration the pressure loss from the installation position to the introduction port 5.

Subsequently, the controller 17 stops the discharging of the mechanical foaming device 100 (step 306). After the discharging is stopped, the controller 17 judges whether the discharge pressure detected at step 304 is in the prescribed pressure range (the range from 4 MPa to 15 MPa, preferably from 5 MPa to 12 MPa. and more preferably from 6 MPa to 10 MPa) (step 308). When the discharge pressure is not in the prescribed pressure range (step 308: No), the controller 17 adjusts, by using the stopper position adjusting part (the stopper support part 16 and the electric motor part 18), the position of the stopper part (the position of the tip end part 14 of the rod 10), i.e., the needle gap amount, so that the discharge pressure is pressure within the prescribed pressure range (step 310). For example, the controller 17 obtains the position T2 (T2') within the nozzle part 2 (2b) in which the tip end 35 (35b) of the needle part 3 (3b) forms the needle gap amount achieving the pressure within the prescribed pressure range, and further calculates the position of the tip end part 14 of the rod 10, i.e., the screw-in amount of the rod 10, corresponding to the position T2 (T2'), so as to control the rotation of the electric motor 50 in the electric motor part 18 to rotate the rod 10 with the calculated screw-in amount.

After the needle gap amount is adjusted, the process returns to step 300 for a checking purpose and goes through steps 302, 304, and 306, before it is judged at step 308 whether or not the discharge pressure is in the prescribed pressure range.

When it is determined at step 308 that the discharge pressure is in the prescribed pressure range (step 308: Yes), the pressure adjusting method according to the present embodiment is completed.

The method shown in FIG. 11 is configured so that, on the basis of the pressure detected by the pressure sensor 15, the controller 17 controls the discharge pressure to be pressure within the prescribed pressure range; however, the method shown in FIG. 11 is also applicable to situations where the user adjusts the position of the stopper part either manually or with driving of a motor. In those situations, the pressure detected at step 304 is visually read as the "discharge pressure", so that if the discharge pressure is determined to be outside the prescribed pressure range at step 308, the stopper position is adjusted to a desired level at step 310 according to an empirical rule. After the adjustment, the process returns to step 300 for the checking purpose, so that the same processes are performed.

Once the needle gap amount is set, it is empirically known that the discharge pressure will not significantly change after that. Accordingly, the method in FIG. 11 basically shows an initial setting before the production of the foamed body. However, there is a possibility that, in the process of producing the foamed body, the discharge pressure may gradually change due to temperature changes and may deviate from the prescribed pressure range. For this reason, according to a pressure adjusting method in another mode of the present embodiment, the discharge pressure detected by the pressure sensor may constantly be monitored during the process of producing the foamed body, so that an alarm signal is issued when it is determined that the detected discharge pressure is not within the prescribed range. Upon receipt of the alarm signal, either the controller 17 or the user stops the mechanical foaming device and adjusts the range needle gap amount so that the discharge pressure is pressure within the prescribed range. Alternatively, when the alarm signal is issued, the needle gap amount may be adjusted after the production of the foamed body is finished.

Although the process in FIG. 11 uses the pressure sensor, when the relationship indicated in FIG. 8 among needle gap amounts, viscosity levels of the paste material, discharge flow amounts, and discharge pressure levels is known in advance, it is also possible to adjust the needle gap amount so that the discharge pressure is pressure within the prescribed pressure range by using the relationship. This process will be explained with reference to the flowchart in FIG. 12.

Figure 12:
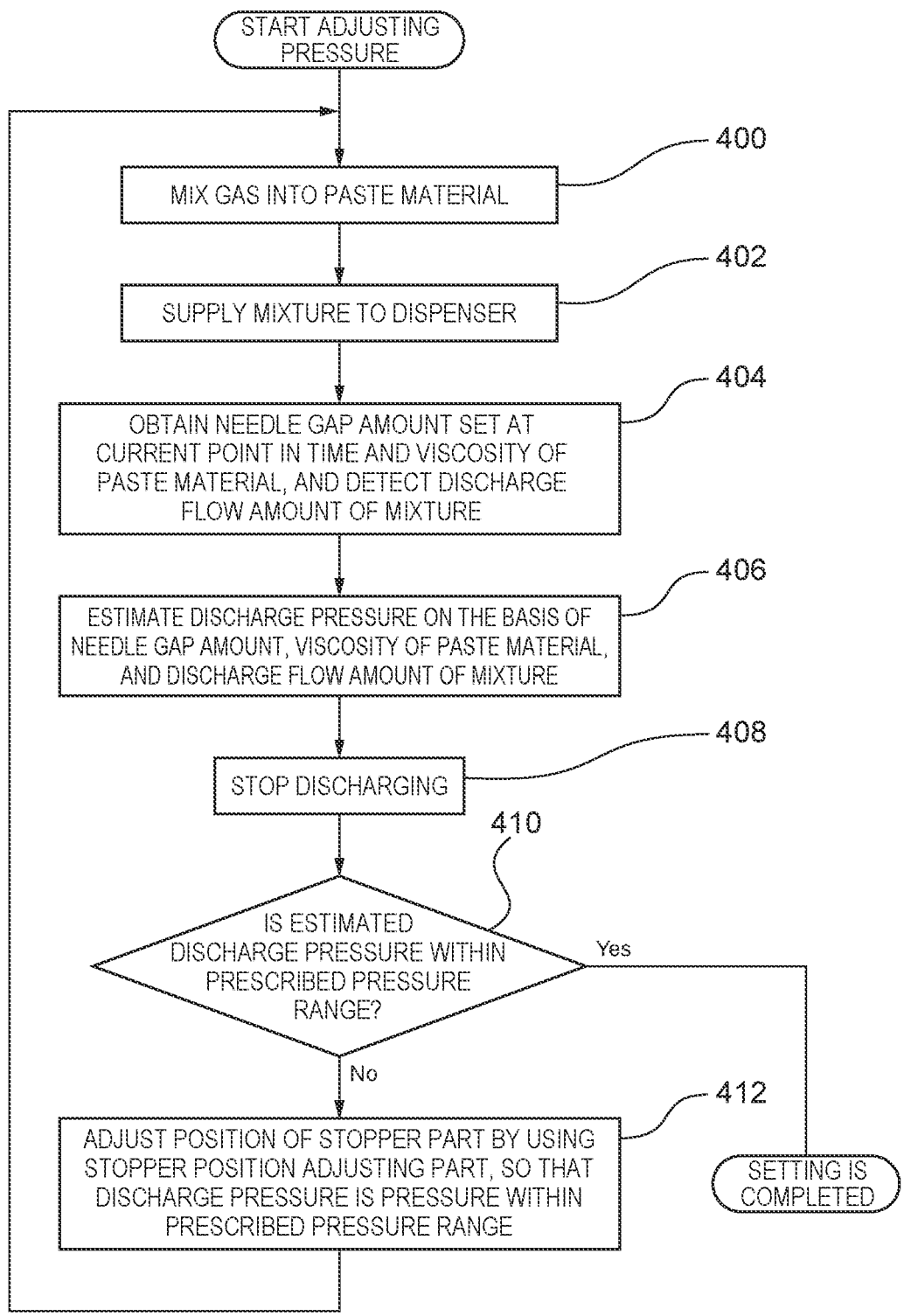
FIG. 12 is a flowchart showing another method for adjusting the pressure of the mixture discharged from the dispenser according to another embodiment of the present invention.

As shown in FIG. 12, the mechanical foaming device 100 mixes the gas into the paste material (step 400), and the mixture is supplied to the dispenser 1 as described above (step 402). Subsequently, the controller 17 obtains the needle gap amount being set at the current point in time and the viscosity of the paste material and further detects the discharge flow amount (step 404). As the discharge flow amount, for example, a flow amount value detected by a flowmeter (not shown) provided in the supply conduit 120 is used.

After that, the discharge pressure is estimated on the basis of the needle gap amount, the viscosity of the paste material, the discharge flow amount, and the viscosity of the paste material obtained at step 404 (step 406). For example, the controller 17 may have the relationship shown in FIG. 8 stored in a memory so as to be able to derive the discharge pressure from the values obtained at step 408 by using the relationship.

Subsequently, the controller 17 stops the discharging of the mechanical foaming device 100 (step 408). After the discharging is stopped, the controller 17 judges whether the discharge pressure estimated at step 406 is in the prescribed pressure range (the range from 4 MPa to 15 MPa, preferably from 5 MPa to 12 MPa. and more preferably from 6 MPa to 10 MPa) (step 410). When the estimated discharge pressure is not in the prescribed pressure range (step 410: No), the controller 17 adjusts, by using the stopper position adjusting part (the stopper support part 16 and the electric motor part 18), the position of the stopper part (the position of the tip end part 14 of the rod 10), i.e., the needle gap amount, so that the discharge pressure is pressure within the prescribed pressure range (step 412).

After the needle gap amount is adjusted, the process returns to step 400 for the checking purpose and goes through steps 402 to 408, before it is judged at step 410 whether or not the discharge pressure is in the prescribed pressure range.

When it is determined at step 410 that the discharge pressure is in the prescribed pressure range (step 410. Yes), the pressure adjusting method according to the present embodiment is completed.

In the process shown in FIG. 12, when the discharge flow amount obtained at step 404 is not detected by the flowmeter, but adopts, without any modification, the value of the discharge flow amount configured in the setting of the mechanical foaming device 100, it is possible to omit the process at steps 400, 402, and 408. In that situation, the discharge pressure is judged only from the setting value, without the actual flowing of the material or the mixing of the gas. When the setting value is changed, the controller 17 will automatically calculate the discharge pressure on the basis of the post-change value and change the needle gap amount. Needless to say, possible modes include a mode in which, at step 404, the stopper position is automatically set at the stage when the information about the flow amount, the temperature, the material viscosity, and the pressure is entered.

The process shown in FIG. 12 is the same as the process shown in FIG. 11 in that the process may be performed by the user instead of by the controller and that the pressure is constantly monitored so as to carry out the same pressure adjusting process if the detected pressure is outside the prescribed range. Further, in the processes shown in FIG. 11 and FIG. 12, it is possible to omit the controller 17 by providing a mechanism that enables manual adjustments of the screwing of the rod 10, i.e., the operation range of the needle part 3 (3*b*). In that situation, a display device is provided so as to display the pressure detected by the pressure sensor 15, so that the user adjusts the operation range of the needle part 3 (3*b*) on the basis of the displayed pressure level. Further, the mechanism that enables manual adjustments includes the mechanism that enables adjustments of the operation range of the needle part by the manual operations without providing an electric motor as described above, as well as the mechanism that enables adjustments of the operation range of the needle part by manually turning on and off the electric motor.

The one embodiment of the present invention has thus been explained. The present invention, however, is not limited to the example described above. It is possible to arbitrarily modify the present invention as appropriate, within the scope thereof.

For example, in the example in FIG. 1, the dispenser 1 is controlled as being attached to the robot 106; however, another configuration is also acceptable in which the foamed body is discharged as the user holds the dispenser 1 and presses a switch. Further, it is also acceptable to use a mechanism for mixing the gas and the paste material together that is different from the mechanical foaming device 100.

Further, as the mechanisms driving the needle part 3 or 3*b*, the example described above employs the raising mechanism of the piston part 8 using the compressed air introduced to the inside of the cylinder part 7 through the compressed air port 9 and the lowering mechanism of the spring (not shown); however, it is also acceptable to employ raising and lowering mechanisms for the needle part 3 or 3*b* using an electric motor. As for the mechanism of the stopper position adjusting part, the present invention is not limited to the example using the screwing of the rod as shown in FIGS. 2A and B. For instance, it is also acceptable to use a sliding style such as a cylinder.

Further, as for the mechanical foaming device used in the methods of the present invention, it is possible to arbitrarily change the configuration thereof as appropriate, as long as the device has the function of mixing gas into a paste material. For example, in the mechanical foaming device shown in FIG. 1, FIG. 9, and FIG. 10, the mixer 104, the constant flow amount cylinder 105, and the constant flow amount pump 109 may optionally be added or may be omitted. Needless to say, the other constituent elements are not limited to the examples presented in the drawings, either.

REFERENCE SIGNS LIST

1: dispenser
2, 2*b*: nozzle part
3, 3*b*: needle part
4: flow path
5: introduction port
6: passage extending from the introduction port 5 to the inside of the body 11
7: cylinder part
8: piston part
9: compressed air port
10: rod
10*a*: screw thread of the rod
11: body of the dispenser
12: rotation transmitting part
13: basal end part of the rod
14: tip end part of the rod
15: pressure sensor
16: stopper support part
16*a*: penetrating hole with the screw thread
17: controller
18: electric motor part
19: support part of the needle part
20, 20*b*: hollow space
21, 21*b*: basal end opening
22, 22*b*: tip end opening
23, 23*b*: tapered section
24, 24*b*: nozzle body
25, 25*b*: nozzle tip end part
26, 26*b*: engagement part of the nozzle body with the dispenser body
27, 27*b*: engagement part of the nozzle body
28, 28*b*: engagement part of the nozzle tip end part
29, 29*b*: discharge port
30, 30*b*: needle body
31, 31*b*: basal end part of the needle part
32, 32*b*: tip end part of the needle part
33, 33*b*: large diameter part
34, 34*b*: axial-direction groove
35, 35*b*: tip end of the tip end part
50: electric motor
51: reduction gear
52: output shaft of the reduction gear 51
53: rotation plate
54: cylindrical projection
100, 100*b*, 100*c*: mechanical foaming device
101: gas supply source
102: paste material supply source
103, 100*b*, 100*c*: connection part
104: mixer
105: constant flow amount cylinder
106: robot
107: gas conduit
108: material conduit
109: constant flow amount pump
110: foam beads
111, 112, 113: piston pump
114: opening/closing valve
116: gas pressure control device
117: pulse valve
120: supply conduit

What is claimed is:

1. A method for adjusting pressure of a mixture of a paste material and gas discharged from a dispenser in a mechanical foaming device that generates and discharges the mixture,
wherein the dispenser includes:
a nozzle part provided in a tip end part of the dispenser and having a tip end opening through which the mixture is discharged;
a flow path for the mixture extending from an introduction part for the mixture to the tip end opening through an inside of the nozzle part;
a needle part movable in the flow path of the nozzle part to open and close the flow path; and
a driving part that drives the needle part,
the nozzle part has a tapered section in which an inside diameter of the flow path of the nozzle part relative to an operation range of a tip end of the needle part decreases toward the tip end opening,
as a result of the tip end of the needle part abutting against a closed position of the tapered section, the flow path for the mixture is closed, whereas as a result of the tip end of the needle part moving away from the closed position, the flow path is opened,
the dispenser further includes:
a stopper part that limits a moving range of the tip end of the needle part to a range from the closed position to a stop position located rearward relative to the closed position; and
a stopper position adjusting part that adjusts a position of the stopper part to change the stop position, and
the method comprises a pressure adjusting step of adjusting discharge pressure of the mixture discharged from the tip end opening of the nozzle part to be pressure within a pressure range of 4 MPa to 15 MPa, by adjusting the position of the stopper part with the stopper position adjusting part,
wherein the mechanical foaming device includes:
a gas conduit used for transporting the gas;
a material conduit used for transporting the paste material;
a connection part to which the gas conduit and the material conduit are connected;
a mixing part that mixes together the gas and the paste material coming out of the connection part;
a gas pressure control device that controls pressure of the gas forwarded to the mixing part through the gas conduit;
a constant flow amount device that keeps constant a flow amount of the mixture of the gas and the paste material mixed by the mixing part; and
the dispenser that receives a supply of the mixture of the gas and the paste material coming out of the constant flow amount device;
wherein the connection part is at least one piston pump, the gas conduit and the material conduit are connected to a cylinder of the piston pump, and
into a cylinder space formed by raising a piston of the piston pump, the gas transported through the gas conduit and the paste material transported through the material conduit are supplied and the gas and the paste material in the cylinder space are pumped forward to the mixing part as a result of lowering the piston.

2. The method according to claim 1, wherein the pressure range of the mixture is either from 5 MPa to 12 MPa or from 6 MPa to 10 MPa.

3. The method according to claim 1, wherein
a pressure sensor to measure the discharge pressure is further provided, and
the pressure adjusting step comprises adjusting the discharge pressure on a basis of the pressure of the mixture detected by the pressure sensor at a time of the mixture being supplied to the dispenser.

4. The method according to claim 1, wherein
the pressure adjusting step comprises estimating the discharge pressure by using a relationship among the discharge pressure, a needle gap amount being a distance between the closed position of the tip end of the needle part and the stop position, viscosity of the paste material, and a discharge flow amount of the mixture and adjusting the needle gap amount so that the estimated discharge pressure is pressure within the pressure range.

5. The method according to claim 1, wherein
a rearmost position of the stop position adjusted by the stopper position adjusting part is a position distant from the closed position by a distance equal to or longer than four times a diameter of the tip end opening.

6. The method according to claim 1, wherein
as the stopper position adjusting part, the stopper part has a rod screwed into a body of the dispenser in an axial direction,
a position of the rod in the axial direction is adjusted according to an amount of being screwed into the body, and
the needle part is stopped as a result of a tip end part of the rod abutting against a basal end part of the needle part.

7. The method according to claim 6, wherein
the stopper position adjusting part further includes an electric motor disposed to rotate the rod, and
the pressure adjusting step comprises adjusting the position of the stopper part by controlling a rotation amount of the rod rotated by the electric motor.

8. The method according to claim 7, wherein
a controller is further provided, and
in the pressure adjusting step, the controller controls the electric motor so that the discharge pressure is pressure within the pressure range.

9. The method according to claim 1, wherein
the stopper position adjusting part has a mechanism that makes the rod manually rotatable, and
a display unit that displays the discharge pressure corresponding to the position of the stopper part is further provided.

10. The method according to claim 1, wherein
in the position distant rearward from the closed position by a distance four times the diameter of the tip end opening, the inside diameter of the flow path is 1.1 to 3 times larger than the diameter of the tip end opening.

* * * * *